United States Patent [19]

Kozakai

[11] 4,186,300
[45] Jan. 29, 1980

[54] FOCUS DETECTOR

[75] Inventor: Masahiro Kozakai, Shimosuwa, Japan

[73] Assignee: Sankyo Kogaku Kogyo Kabushiki Kaisha

[21] Appl. No.: 880,463

[22] Filed: Feb. 23, 1978

[30] Foreign Application Priority Data

Nov. 30, 1977 [JP] Japan ............... 52-161088

[51] Int. Cl.² .......................... G01J 1/20
[52] U.S. Cl. ................. 250/204; 250/201; 354/25
[58] Field of Search ............ 250/201, 204; 354/25

[56] References Cited

U.S. PATENT DOCUMENTS

| | | | |
|---|---|---|---|
| 3,720,148 | 3/1973 | Harvey | 250/204 |
| 4,078,172 | 3/1978 | Wilwerding | 250/201 |
| 4,123,765 | 10/1978 | Isono | 250/201 X |

Primary Examiner—David C. Nelms
Assistant Examiner—Darwin R. Hostetter
Attorney, Agent, or Firm—McGlew and Tuttle

[57] ABSTRACT

A focus detector includes a movable reflecting mirror and a stationary reflecting mirror which reflect incident light admitted through a pair of independent windows for the purpose of comparison. A drive for the movable mirror drives it with different speeds during its movement in a forward and a reverse direction. The comparison takes place when the movable mirror is driven at a lower speed. The drive includes a non-symmetrical eccentric cam, a motor for rotating the eccentric cam, and a support for the movable mirror which bears against the eccentric cam. The eccentric cam is provided integrally with a mode selection cam, which operates to open and close a comparison enable switch.

4 Claims, 6 Drawing Figures

FOCUS DETECTOR

BACKGROUND OF THE INVENTION

The invention relates to a focus detector of the type utilizing the comparison of incident light, which is advantageous for use in a continuous photographing operation as may be achieved with a motor driven still camera or cine camera.

The present applicant has previously proposed a variety of automatic focussing apparatuses which can be applied to a continuous photographing operation as with a cine camera. The proposed apparatus allows an automatic focussing to be achieved continuously even if the distance to an object being photographed varies from time to time. One of such apparatuses is disclosed in Japanese Patent Application No. 81,558/1976, and includes a stationary and a movable reflecting mirror, each of which is adapted to receive incident light admitted through a pair of independent windows and passes it to a corresponding light receiving element for the purpose of comparison. Specifically, the focus detector disclosed in such prior application comprises drive means for performing a movement of a focussing lens independently from the rotation of the reflecting mirror, means for producing a first signal when the amounts of light fed by the reflection of the respective mirrors are equal to each other, means for producing a second signal when the distance to an object being photographed to which the foccusing lens is focussed becomes equal to the distance to the point of intersection between the optical axes of the optical systems comprising the pair of reflecting mirrors, and means for determining the direction in which the focussing lens is to be moved in accordance with the relative timing of the first and the second signal.

The described focus detector is capable of detecting the focus and hence achievinga focussing operation in following relationship with a moving object being photographed, and hence is usable in a continuous photographing operation as with a cine camera. However, the movable mirror undergoes a reciprocating movement, and since the relative timing of the first and the second signal is reversed during the forward and the reverse movement, it is necessary to perform the focus detection only during the forward or reverse movement. Because the speed of movement of the movable mirror in the foward direction is equal to that in the reverse direction, it follows that one-half the time required for the reciprocating movement of the mirror represents a waste time which has no contribution to the focus detection.

SUMMARY OF THE INVENTION

It is an object of the invention to provide a focus detector capable of achieving an accurate focus detection with a minimized waste time.

In accordance with the invention, the speed of movement of the movable mirror in the forward direction is different from that in the reverse direction, and the comparison of incident light takes place during a stroke in which the movable mirror moves with a lower speed. In this manner, the waste time is minimized while at the same time allowing the comparison of incident light to be performed during the time when the movable mirror rotates at a lower rate to thereby assure a reliable focus detection. The arrangement is advantageous particularly when the focus detection is to take place in a dark place. An accurate and rapid focus detection is performed at a given time interval.

DETAILED DESCRIPTION OF PREFERRED EMBODIMENT

Figure 1:
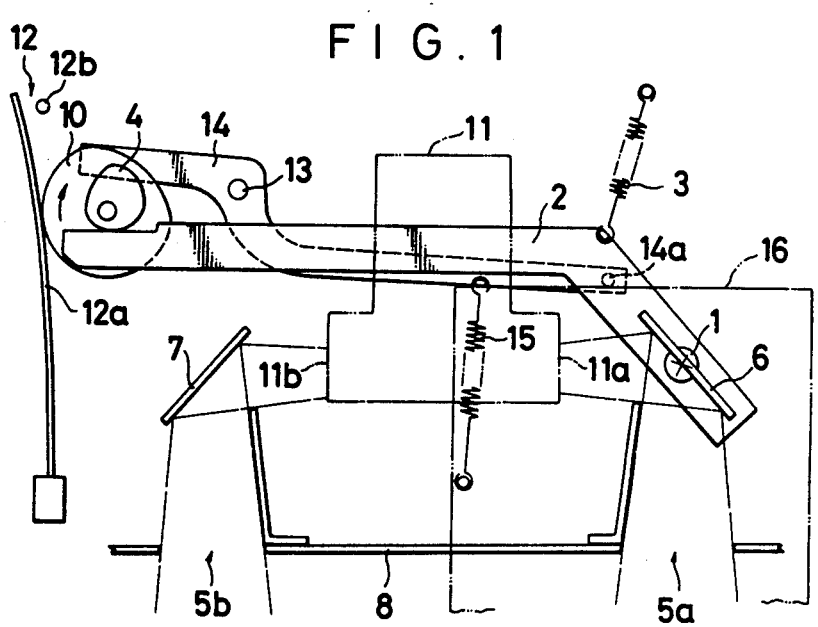
FIG. 1 is a plan view of one embodiment of the invention.
Figure 2:
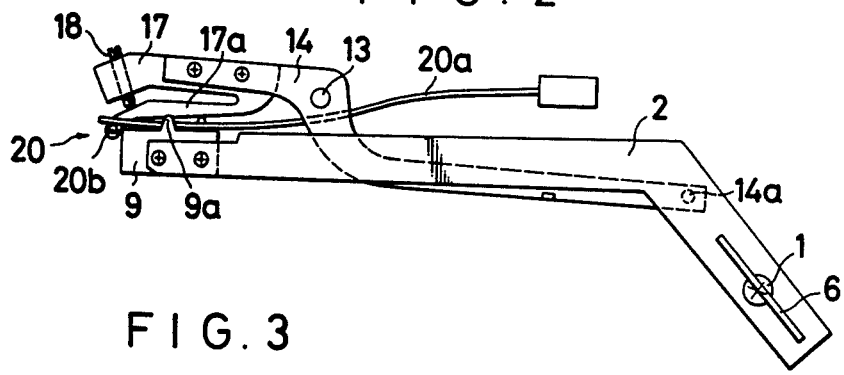
FIG. 2 is a plan view showing the detail of part of the embodiment shown in FIG. 1.

Referring to FIGS. 1 and 2, there is shown a pivot 1, mounted on a base plate, not shown, and a lever 2 which supports a movable reflecting mirror is rotatably mounted thereon. The lever 2 is urged by a tension spring 3 to rotate clockwise, but the resulting rotation is limited by the abutment of a lateral edge of its free end against the profiled surface of a non-symmetrical eccentric cam 4, which is maintained in rotation by a motor, not shown. The movable reflecting mirror 6 is fixedly mounted on the lever 2 in a plane including the axis of the pivot 1 and is disposed so as to reflect light, which is incident thereon through a window 5a, substantially 90° to the left. A stationary reflecting mirror 7 is fixedly mounted on a base plate, not shown, in a symmetrical manner with respect to the movable mirror 6 so that it reflects incident light, which is admitted through a window 5b, 90° to the right. Light comparison means 11 is fixedly located between these mirrors and has a pair of light receiving surfaces 11a, 11b which are adapted to receive light as reflected by the respective mirrors. The comparison means 11 includes light receiving elements mounted on the surfaces 11a, 11b, respectively, and an electrical comparison circuit which compares the outputs from the respective elements and produces a signal indicating that the focussing requirement is satisfied by the mirrors 6, 7 when the outputs from the respective elements are equal to each other, or in other words, when the optical axis of the optical system including the mirror 6 intersects with the optical axis of the optical system including the mirror 7 at an object being photographed. Such comparison circuit may comprise any known arrangement which is generally used in any conventional automatic focus detector or exposure meter circuit. A light shield 8 is disposed in front of the comparison means 11.

Figure 3:
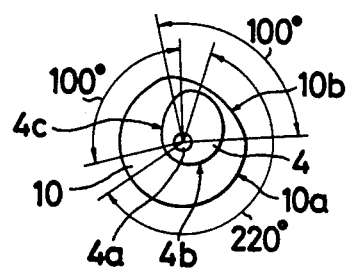
FIG. 3 is a detail view of the cam used in the detector shown in FIG. 1.

As shown in FIG. 3, the eccentric cam 4 includes a rotary shaft 4a. The cam 4 is formed with a cam profile 4b over an angle of 220° and which increases in diameter as viewed in counterclockwise direction, a pair of cam profiles having a constant radius of curvature and contiguous with the respective opposite ends of the cam profile 4b, and another cam profile 4c extending over an angle of 100° and extending between the other ends of the constant diameter cam profiles and which is nearly flat in configuration. As the cam 4 rotates clockwise at a uniform rate, the lever 2 undergoes a reciprocating movement. It will be seen from FIGS. 1 and 3 that during the time the lever 2 bears against the cam profile 4b, the lever 2 will rotate counterclockwise about the pivot 1 at a relatively slow rate while the lever 2 will rotate clockwise rapidly when it bears against the nearly flat cam profile 4c.

Concentrically and integrally mounted on the rotary shaft 4a of the cam 4 is a mode selection cam 10 which includes a cam profile 10a having a constant radius of curvature and extending over an angle of 260° and another cam profile 10b extending over an angle of the remaining 100° and having a more flattened configuration and smoothly joined with the opposite ends of the cam profile 10a. Assuming that the cam 4 is adapted to rotate clockwise, the flattened cam profile 10b is located at an angular position which is 90° advanced in phase relative to the flattend cam profile 4c. A detection switch 12 which detects the reciprocating movement of the lever 2 comprises a pair of contacts 12a and 12b. The contact 12a is in the form of an elongated blade bearing against the left-hand side of the cam 10, as shown in FIG. 1, while the contact 12b is fixed and spaced from the free end of the contact 12a to the right-hand side thereof. As a consequence, during the clockwise rotation of the cams 4, 10, when they are driven by the motor, not shown, the contact 12a will bear against the cam profile 10a to open the switch 12 when the lever 2 bears against the cam profile 4b and rotates counterclockwise while the contact 12a will bear against the cam profile 10b to close the switch 12 when the lever 2 bears against the cam profile 4c and thus rotates clockwise.

As shown in FIG. 2, an abutment piece 9 of an insulating material is secured to the free end of the lever 2 in offset manner from the surface of the lever 2. The abutment piece 9 is formed with a pair of spaced locating dowels 9a on its top surface, as viewed in FIG. 2, and a switch contact 20a in the form of a resilient blade extends through the space between the dowels and is held against the abutment piece 9 by virtue of its own resilience.

A lens position detecting lever 14 is pivotally mounted on a pin 13 which is secured to the base plate, not shown, and has one arm, the majority of which is disposed in superimposed relationship with the lever 2 and fixedly carries a pin 14a on its free end. The lever 14 is urged by a tension spring 15 to rotate clockwise, as viewed in FIGS. 1 and 2, but the resulting rotation is limited by the abutment of the pin 14a against an end face of a focussing lens sleeve 16, shown in phantom line. It is to be understood that the sleeve is adapated to be moved in the vertical direction, as viewed in FIG. 1, by a drive motor contained in a lens drive circuit to be described later. As a consequence, the lever 14 will rotate about the pin 13 as the sleeve 16 moves vertically. A contact holder 17, of an insulating material, is secured to the free end of the other arm of the lever 14 and includes a resilient arm 17a which is folded upon itself to extend parallel to the body of the holder 17. Another switch contact 20b is fixedly mounted on the free end of the resilient arm 17a so as to be capable of engaging the switch contact 20a from below by its movement perpendicular thereto, as viewed in FIG. 2. The contacts 20a, 20b form together a lens position detecting switch 20. It will be understood that switch 20 will be either closed or opened in accordance with the position of the focussing lens contained in the taking lens system and the angular position of the lever 2. An adjusting screw 18 is threadably engaged with the holder 17 in order to adjust the position of the switch contact 20b. The arrangement is such that the switch 20 is either opened or closed when the distance to an object being photographed as determined by the reflecting mirrors 6, 7 coincides with the distance to an object being photographed as determined by the taking lens system.

When the cams 4, 10 are continuously rotated by the motor, not shown, the lever 2 angularly moves in the reciprocatory manner as mentioned above, accompanying a corresponding angular movement of the movable mirror 6. Since the cam 4 is formed as a non-symmetrically eccentric cam, the movable mirror 6 rotates slowly counterclockwise, or when the distance to an object being photographed as determined by the mirrors 6, 7 changes from a near point toward the infinity, while it rotates rapidly clockwise, or when the distance determined by the mirrors 6, 7 changes from infinity toward a near point. As the movable mirror 6 rotates in a reciprocatory manner, the incident light thereon as reflected by the mirror 6 onto the light receiving surface 11a varies from time to time while the incident light on stationary mirror 7 as reflected thereby onto the light receiving surface 11b remains constant. During one cycle of variation of the incident light reflected to the surface 11a, the focussing requirement is satisfied at a pair of locations, where the comparison means 11 produces a focussed signal. The switch 12 remains open when the focus, as determined by the mirrors 6, 7, changes from a near point to the infinity, and remains closed when the focus changes from the infinity toward a near point. Depending on the relative position of the lens sleeve 16 and the lever 2, the lens position detecting switch 20 will be switched twice during the reciprocatory movement of the lever 2 whereby it produces a signal which may be termed a lens position signal.

Figure 5:
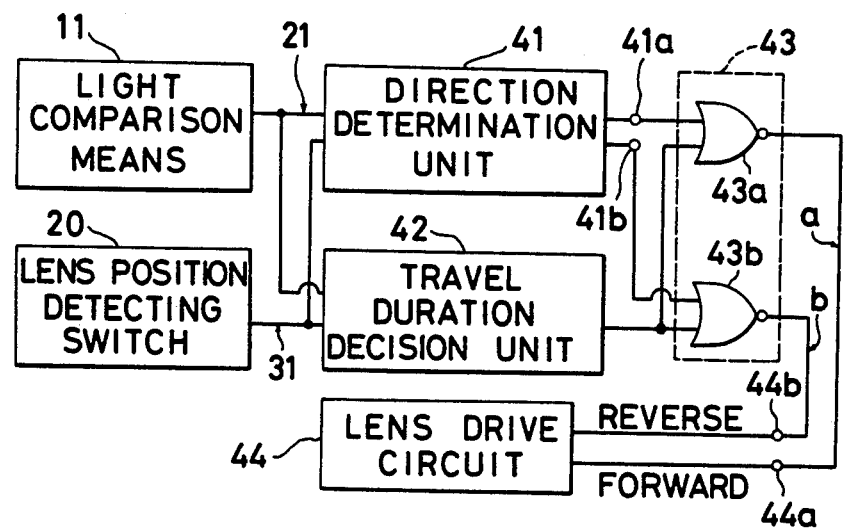
FIG. 5 is a block diagram of an electrical control circuit which is used in the present invention.

FIG. 5 shows an electrical control circuit which may be used to achieve an automatic focussing operation in response to the signals from the switches mentioned above. The light comparison means 11 is shown as producing a focussed signal 21 while the lens position detecting switch 20 is shown as producing a lens position signal 31. Both of these signals 21, 31 are applied to a direction determination unit 41 and a travel duration decision unit 42. The direction determination unit 41 may comprise a flipflop, for example, which may have its input connected with the detecting switch 12 so that it receives the focussed signal 21 and the lens position signal 31 only when the lever 2 rotates slowly, or when the focussing requirement determined by the reflecting mirrors 6, 7 changes from a near point toward the infinity. When the focussed signal 21 occurs earlier than the lens position signal 31, the flipflop produces a low level signal at its output terminal 41a while it produces a low level signal at its other output terminal 41b when the occurrence of the focussed signal 21 is later than the lens position signal 31. When both signals occur in time coincidence, a high level signals are produced at both its terminals 41a, 41b. The output terminal 41a of the unit 41 is connected with one input of NOR circuit 43a contained in a mixer 43 while the other output terminal 41b is connected with one input of another NOR circuit 43b in the mixer 43. The travel duration decision unit 42 detects a time difference between the occurrence of the focussed signal 21 and the lens position signal 31 and produces a low level pulse signal of a width which corresponds to the time difference. The output terminal of the unit 42 is connected with the other inputs of NOR circuits 43a, 43b, respectively. NOR circuit 43a has its output terminal connected with a forward control input 44a of a lens drive circuit 44 while NOR circuit 43b has its output terminal connected with the reverse control input 44b thereof.

Figure 6:
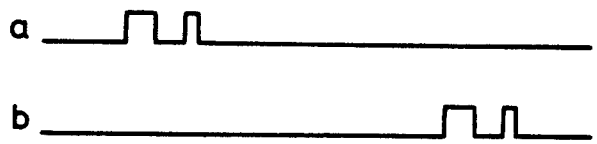
FIG. 6 is a timing chart illustrating the operation of the control circuit.

Considering the operation of the described apparatus, when the cam 4 rotates to cause a reciprocatory angular movement of the lever 2, the focussed signal 21 is produced twice during one cycle of reciprocatory motion of the lever 2, and the switch 12 is also opened and closed. Similarly, the switch 20 produces the lens position signal 31. In response to the operation of the detecting switch 12, the direction determination unit 41 is operative to receive the focussed signal 21 and the lens position signal 31 only during the time the focus determined by the reflecting mirrors 6, 7 changes from a near point toward the infinity. The relative timing of occurrence of these signals is examined, and if the focussed signal 21 occurs earlier than the lens position signal 31, a low level signal is produced at the output terminal 41a of the unit 41. The travel duration decision unit 42 responds to the signals 21, 31 to produce a pulse signal having a width which corresponds to the time difference between the occurrence of the signals 21, 31. As a consequence, there is produced, at the output terminal of NOR circuit 43a, a high level signal of a form similar to that of the signal supplied thereto from the unit 42, as shown in FIG. 6a. However, NOR circuit 43b produces no output. The output from NOR circuit 43a is applied to the forward control input 44a of the lens drive circuit 44, which causes the focussing lens sleeve 16 to move in the forward direction. Since the signals 21, 31 are produced intermittently as the lever 2 reciprocates, the drive of the focussing lens sleeve by the lens drive circuit 44 occurs each time the signals 21, 31 are produced until the focussing lens is exactly focussed with an object being photographed. Since the signals 21 and 31 occur in time coincidence under the focussed condition, none of units 41, 42 and mixer 43 produces a signal, and hence the lens drive circuit 44 ceases to operate, thus completing focussing operation. As will be noted from FIG. 6a, the forward control signal supplied by NOR circuit 43a has a decreasing width as successive focussing operations take place.

Depending on the location or movement of an object being photographed, the signal 21 may occur later than the signal 31. In this instance, a low level signal is produced at the other output terminal 41b of the unit 41. Hence, a high level signal of a form similar to that of the signal supplied by the unit 42 will then be produced at the output terminal of NOR circuit 43b, as shown in FIG. 6b. This output signal is applied to the reverse control input 44b of the lens drive circuit 44, which performs a focussing operation of the focussing lens sleeve 16 in the opposite direction from that mentioned above.

Figure 4:
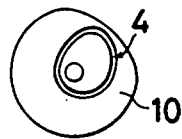
FIG. 4 is a plan view of another form of cam.

FIG. 4 shows that the non-symmetrical eccentric cam 4 may be formed a a groove cam of a configurations similar to that shown in FIG. 3, and receiving therein a follower pin which is fixedly mounted on the lever 2.

While specific embodiments of the invention have been shown and described in detail to illustrate the principles of the invention, it will be understood that the invention may be embodied otherwise without departing from such principles.

What is claimed is:

1. Focus detector of the type in which incident light admitted through a pair of independent windows is reflected by a stationary reflecting mirror and a movable reflecting mirror to respective light receiving elements for comparison thereof, said focus detector comprising drive means operable to drive said movable reflecting mirror at a first speed of movement in a forward direction and at a second speed of movement in the reverse direction, said second speed being different from said first speed; and means operable to compare the light incident on said stationary mirror and that incident on said movable mirror only during the time said movable mirror moves at the lower of said first and second speeds.

2. Focus detector according to claim 1 in which said drive means comprises a continuously rotated non-symmetrical eccentric cam; and a member mounting said movable reflecting mirror and maintained in abutment against said cam.

3. Focus detector according to claim 2 in which said non-symmetrical eccentric cam is provided with a mode selection cam which is disposed in concentric relationship therewith, and further including a comparison enable switch which is operated by said mode selection cam.

4. Focus detector according to claim 2 in which said non-symmetrical eccentric cam is formed as a groove cam.

* * * * *